United States Patent
Gardes et al.

(10) Patent No.: US 11,161,619 B2
(45) Date of Patent: Nov. 2, 2021

(54) TURBOJET ENGINE COMPRISING A NACELLE EQUIPPED WITH A FAN CASE AND WITH A FIXED STRUCTURE

(71) Applicant: Airbus Operations SAS, Toulouse (FR)

(72) Inventors: Pascal Gardes, Levignac (FR);
Frédéric Ridray, L'Isle Jourdain (FR);
Frédéric Piard, Tournefeuille (FR);
José Goncalves, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 277 days.

(21) Appl. No.: 16/274,601

(22) Filed: Feb. 13, 2019

(65) Prior Publication Data
US 2019/0283892 A1 Sep. 19, 2019

(30) Foreign Application Priority Data
Mar. 13, 2018 (FR) ...................... 1852170

(51) Int. Cl.
*B64D 29/06* (2006.01)
*F02K 1/80* (2006.01)
(Continued)

(52) U.S. Cl.
CPC ............. *B64D 29/06* (2013.01); *B64D 27/18* (2013.01); *B64D 29/02* (2013.01); *B64D 29/04* (2013.01);
(Continued)

(58) Field of Classification Search
CPC ... B64D 29/06; F02K 1/80; F02K 1/72; F02K 1/70; F01D 25/28
See application file for complete search history.

(56) References Cited

U.S. PATENT DOCUMENTS

| 3,262,271 A * | 7/1966 | Beavers | B64D 33/04 60/226.2 |
| 2007/0209314 A1* | 9/2007 | Vaughn | F16B 9/01 52/838 |
| 2008/0072571 A1 | 3/2008 | Beardsley et al. | |
| 2008/0271432 A1* | 11/2008 | Tsou | F02K 1/72 60/226.2 |

(Continued)

FOREIGN PATENT DOCUMENTS

| CN | 102859168 A | 1/2013 |
| EP | 1852595 A2 | 11/2007 |

(Continued)

OTHER PUBLICATIONS

French Search Report, priority document.

*Primary Examiner* — Andrew H Nguyen
(74) *Attorney, Agent, or Firm* — Greer, Burns & Crain, Ltd.

(57) ABSTRACT

A turbojet engine comprising an engine, a nacelle comprising a fan case, an intermediate case having a part forming a hub and an outer shroud radially spaced away from the hub by a secondary, or bypass, flow path and fixed to the hub via arms, in which the outer shroud is situated to the rear and in the continuity of the fan case, a fixed structure fixed to the outer shroud, a mobile assembly mounted with the ability to effect translational movement on the fixed structure, and a ramp fixed to the outer shroud and configured to direct the secondary or bypass flow to exit the outer shroud. Such a turbojet engine makes it possible to simplify assembly and among other things, makes it possible to fix the ramp directly to the outer shroud.

7 Claims, 5 Drawing Sheets

(51) Int. Cl.
*F02K 1/72* (2006.01)
*B64D 27/18* (2006.01)
*F02K 3/06* (2006.01)
*B64D 29/02* (2006.01)
*F02K 1/62* (2006.01)
*B64D 29/04* (2006.01)
*F02K 1/64* (2006.01)
*F02K 1/70* (2006.01)
*F01D 25/28* (2006.01)

(52) U.S. Cl.
CPC ............... *F02K 1/625* (2013.01); *F02K 1/64* (2013.01); *F02K 1/70* (2013.01); *F02K 1/72* (2013.01); *F02K 1/80* (2013.01); *F02K 3/06* (2013.01); *F01D 25/28* (2013.01); *F05D 2240/14* (2013.01); *F05D 2260/30* (2013.01)

(56) References Cited

U.S. PATENT DOCUMENTS

| | | |
|---|---|---|
| 2013/0025260 A1 | 1/2013 | Pitiot et al. |
| 2013/0126638 A1* | 5/2013 | Vauchel ............ F02K 1/805 |
| | | 239/265.19 |
| 2013/0228635 A1 | 9/2013 | Caruel |
| 2013/0255225 A1 | 10/2013 | Charon et al. |
| 2014/0369829 A1 | 12/2014 | Joret et al. |
| 2015/0107221 A1 | 4/2015 | Aten et al. |
| 2016/0273487 A1* | 9/2016 | Vauchel ............ F02K 1/805 |

FOREIGN PATENT DOCUMENTS

| | | |
|---|---|---|
| EP | 2863038 A1 | 4/2015 |
| FR | 2824598 A1 | 11/2002 |
| FR | 2987600 A1 | 9/2013 |
| WO | 2011124793 A1 | 10/2011 |
| WO | 2014007875 A2 | 1/2014 |

* cited by examiner

TURBOJET ENGINE COMPRISING A NACELLE EQUIPPED WITH A FAN CASE AND WITH A FIXED STRUCTURE

CROSS-REFERENCES TO RELATED APPLICATIONS

This application claims the benefit of the French patent application No. 1852170 filed on Mar. 13, 2018, the entire disclosures of which are incorporated herein by way of reference.

FIELD OF THE INVENTION

The present invention relates to a bypass turbojet engine which comprises a nacelle equipped with a fan case and with a fixed structure supporting a mobile assembly which is able to effect a translational movement with respect to the fixed structure, and to an aircraft comprising at least one such bypass turbojet engine.

BACKGROUND OF THE INVENTION

An aircraft comprises a fuselage, to each side of which a wing is fixed. Suspended under each wing is at least one bypass turbojet engine. Each bypass turbojet engine is fixed under the wing via a pylon which is fixed between the structure of the wing and the structure of the bypass turbojet engine.

The bypass turbojet engine comprises an engine and a nacelle which is fixed around the engine and which between them delimit a secondary, or bypass, flow path.

The nacelle comprises a fan case which is arranged around the fan and around the engine. The nacelle also comprises a mobile assembly which moves backward to uncover a window between the secondary, or bypass, flow path and the outside.

The mobile assembly also bears inner vanes each of which is able to move in order to adopt a deployed position in which it positions itself across the secondary flow path to deflect the secondary, or bypass, flow towards the outside through the window.

The mobile assembly moves on a fixed structure which is itself fixed around the fan case.

The mobile assembly also bears a ramp for guiding the secondary, or bypass, flow. This ramp is also referred to as the "fan ramp."

For reasons of structural simplification, it is necessary to find optimal solutions for fixing the fixed structure and the ramp.

SUMMARY OF THE INVENTION

It is an object of the present invention to provide a bypass turbojet engine which comprises a nacelle equipped with a fan case and with a fixed structure on which a mobile assembly moves and in which the fixing of the fixed structure is optimized.

To this end, there is proposed a bypass turbojet engine comprising:
an engine,
a nacelle surrounding the engine and comprising a fan case, in which a flow path for a secondary, or bypass, flow is delimited between the fan case and the engine and in which an air flow circulates,
an intermediate case having a part that forms a hub and an outer shroud radially spaced away from the hub by the secondary flow path and fixed to the hub via arms, in which the outer shroud is situated to the rear and in the continuity of the fan case,
a fixed structure fixed to the outer shroud,
a mobile assembly mounted with the ability to effect translational movement on the fixed structure in a direction of translational movement between a retracted position in which the mobile assembly is moved towards the rear so as to uncover a window between the secondary flow path and the outside, and a forward position in which the window is closed off by the mobile assembly, and
a ramp fixed to the outer shroud and intended to direct the secondary, or bypass, flow to exit the outer shroud.

Such a turbojet engine allows assembly to be simplified and amongst other things allows the ramp to be fixed directly to the outer shroud.

Advantageously, the ramp has a skirt which is positioned around the outer shroud.

Advantageously, the bypass turbojet engine comprises a 12-o'clock beam, a 6-o'clock beam, a 3-o'clock beam and a 9-o'clock beam, of which each beam has a first end which is fixed to the fixed structure and a second end which is fixed to the outer shroud.

Advantageously, the second end of each beam is fixed to the outer shroud by means of a fitting fixed, on the one hand, to the second end, and, on the other hand, to the outer shroud.

Advantageously, when the ramp has a skirt which is positioned around the outer shroud, the skirt is sandwiched between the outer shroud and each fitting, and the bypass turbojet engine comprises clamping bolts for clamping the fitting against the outer shroud.

Advantageously, the fixing of the 3-o'clock beam and of the 9-o'clock beam to the fitting is achieved by threaded fasteners, the axes of which are radial with respect to the outer shroud.

Advantageously, the fixing of the 12-o'clock beam to the fitting is provided by a pivot connection the axis of which is parallel to a longitudinal axis X of the bypass turbojet engine.

Advantageously, the fixing of the 6-o'clock beam to the fitting is provided by threaded fasteners the axes of which are parallel to a transverse axis Y of the bypass turbojet engine.

Advantageously, each beam is equipped with an end-stop forming a plane perpendicular to a longitudinal axis X of the bypass turbojet engine and each fitting has a mating end-stop forming a plane perpendicular to the longitudinal axis X bearing against the end-stop of the associated beam.

The invention also proposes an aircraft comprising at least one bypass turbojet engine according to one of the foregoing alternative forms.

BRIEF DESCRIPTION OF THE DRAWINGS

The abovementioned features of the invention, together with others, will become more clearly apparent from reading the following description of one exemplary embodiment, the said description being given in connection with the attached drawings among which.

DETAILED DESCRIPTION OF THE PREFERRED EMBODIMENTS

In the description which follows, terms relating to a position are considered with reference to the direction of travel of the aircraft moving forward.

Figure 1:
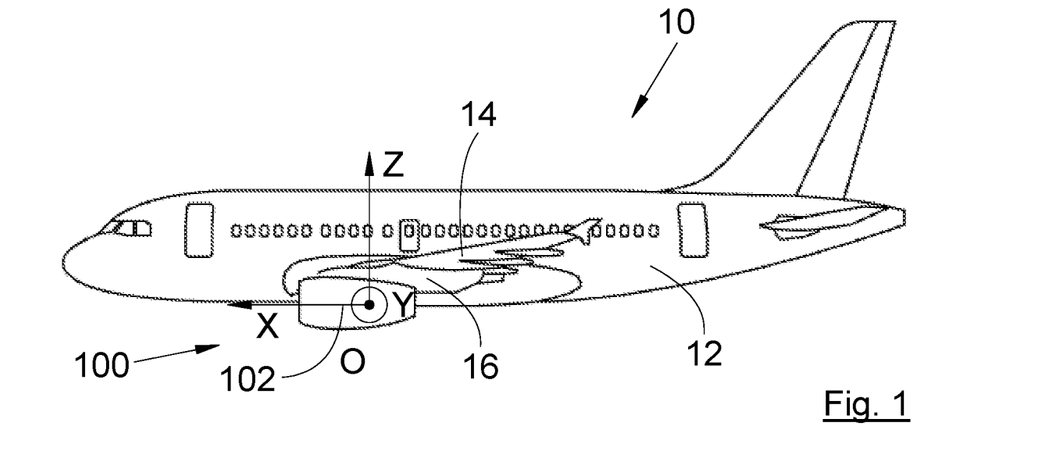
FIG. 1 is a side view of an aircraft comprising a bypass turbojet engine according to the invention.

FIG. 1 shows an aircraft 10 which comprises a fuselage 12, to each side of which is fixed a wing 14 which bears at least one bypass turbojet engine 100 according to the invention. The bypass turbojet engine 100 is fixed under the wing 14 by means of a pylon 16.

The bypass turbojet engine 100 has a nacelle 102.

Figure 2:
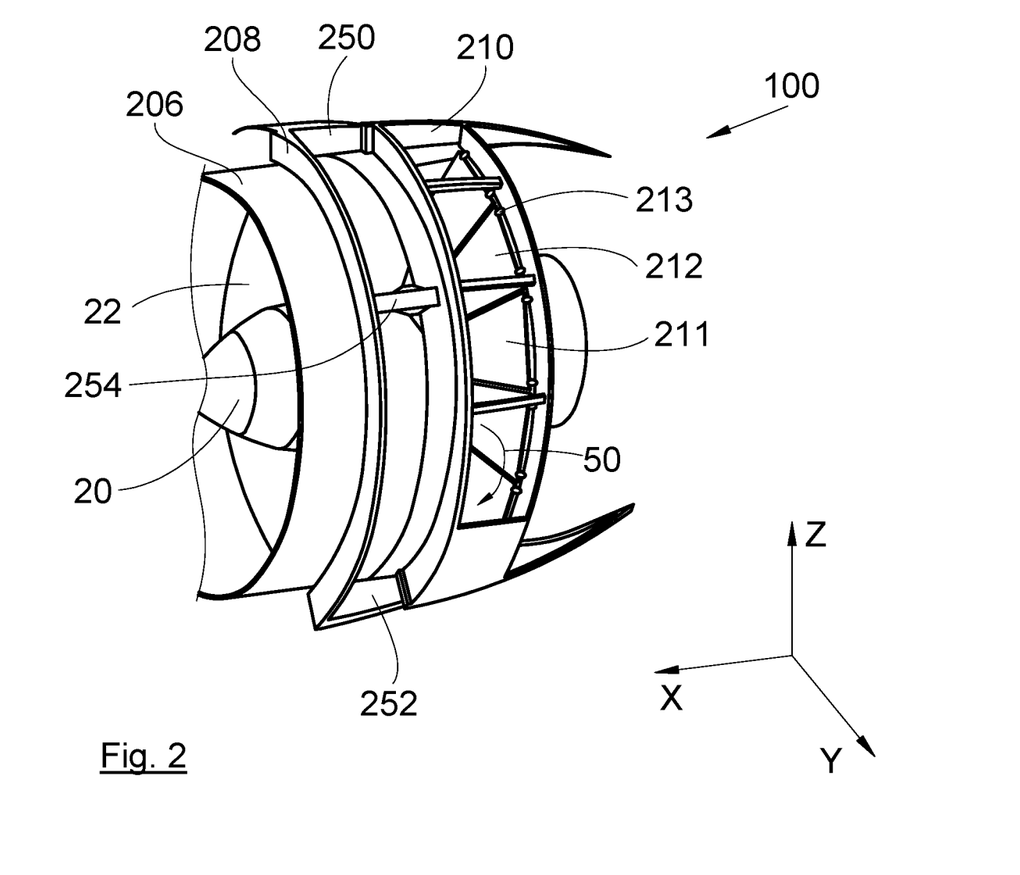
FIG. 2 is a perspective view, from the front, of the bypass turbojet engine according to the invention.
Figure 3:
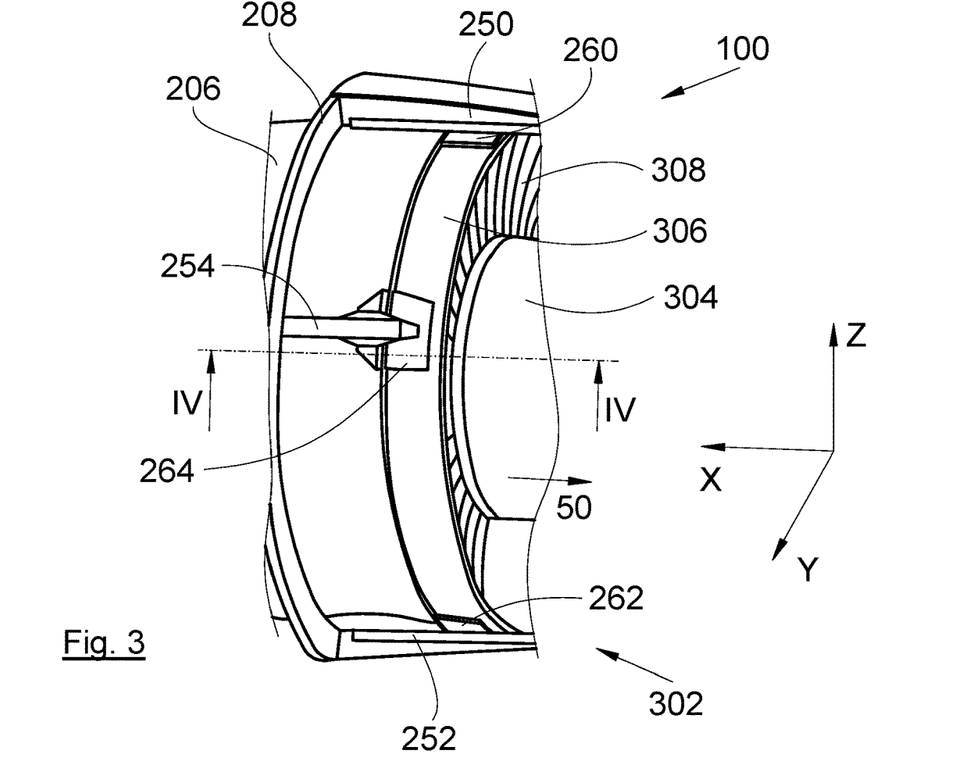
FIG. 3 is a perspective view, from the rear, of the bypass turbojet engine of FIG. 2.

FIG. 2 and FIG. 3 show the bypass turbojet engine 100 which also has an engine 20 housed inside the nacelle 102.

The nacelle 102 comprises a fan case 206 arranged around the engine 20. The engine 20 is embodied in FIG. 2 by its spinner and its fan 22, housed inside the fan case 206 at the air intake of the nacelle 102.

In the description which follows, and by convention, the longitudinal axis of the bypass turbojet engine 100, which is parallel to the longitudinal axis of the aircraft 10 and oriented positively toward the front of the aircraft 10 is referred to as X, the transverse axis which is horizontal when the aircraft is on the ground is referred to as Y, and the axis that is vertical when the aircraft is on the ground is referred to as Z, these three directions X, Y and Z being mutually orthogonal.

A secondary or bypass flow path along which there circulates a secondary or bypass flow 50, is delimited between the engine 20 and the nacelle 102, and more particularly between the fan case 206 and the engine 20.

When the bypass turbojet engine 100 is in operation, a mass of air is drawn in by the air intake then expelled at the rear by the fan 22. The mass of air is split, from upstream to downstream in a direction in which a flow of air passing through the bypass turbojet engine 100 and substantially parallel to the longitudinal axis X flows, into a primary flow, which circulates along a primary flow path and into a secondary, or bypass, flow 50, which is concentric with the primary-air flow and circulates in the secondary, or bypass, flow path, or fan duct. The two flow paths are separated by an inter-stream divider.

The primary flow passes from upstream to downstream with respect to the air flow, through the various elements of the engine, namely a compressor stage, for example comprising a low-pressure compressor and a high-pressure compressor downstream of the low-pressure compressor, a combustion chamber, a turbine stage comprising, for example, a high-pressure turbine and a low-pressure turbine downstream of the high-pressure turbine.

Structural cases are mounted around the elements of the bypass turbojet engine 100 and make it possible to stiffen same in order notably to limit its distortions in operation.

Thus, the fan 22 is ducted by the fan case 206, and the elements of the engine 20 are surrounded, from upstream to downstream, by a low-pressure compressor casing which surrounds the low-pressure compressor, a high-pressure compressor casing which surrounds the high-pressure compressor, then an engine case referred to as the "core-turbine" case which surrounds the combustion chamber and the high-pressure and low-pressure turbines.

The bypass turbojet engine 100 further comprises an intermediate case 302 that has a part forming a hub 304 and an outer shroud 306 which is cylindrical and radially spaced away from the hub 304 by the secondary flow path and fixed to the hub 304 via arms 308 (outlet guide vanes or OGVs) which straighten the secondary, or bypass, flow 50.

The outer shroud 306 is also referred to as the OGV ring.

The outer shroud 306 is situated to the rear and in the continuity of the fan case 206 and extends the latter to externally delimit the secondary, or bypass, flow path, whereas the outer part of the hub 304 internally delimits the secondary, or bypass, flow path.

The bypass turbojet engine 100 has a fixed structure 208 which is fixed to the outer shroud 306 and which bears a mobile assembly 210 (visible only in FIG. 2).

The mobile assembly 210 which here takes the form of a port-side perforated half cylinder and of a starboard-side perforated half-cylinder (not visible in FIG. 2), is mounted with the ability to effect translational movement in a direction of translational movement parallel to the longitudinal axis X between a forward position and a retracted position. In the retracted position, the mobile assembly 210 is moved towards the rear of the nacelle 102 so as to uncover a window 211 between the secondary, or bypass, flow path and the outside of the nacelle 102. In the forward position, the window 211 is closed off by the elements that make up the mobile assembly 210.

The mobile assembly 210 bears inner vanes 212 in which each is able to move between a nonobstructing position in which the inner vane 212 is out of the secondary flow path and a deployed position in which the inner vane 212 positions itself across the secondary, or bypass, flow path to deflect the secondary, or bypass, flow 50 towards the outside through the window 211. In the deployed position, the inner vanes 212 are oriented towards the engine 20.

The inner vanes 212 are in the nonobstructing position when the mobile assembly 210 is in the forward position, and the inner vanes 212 can adopt the deployed position only when the mobile assembly 210 is in the retracted position.

In order to assist with directing the secondary or bypass flow 50 that passes through the window 211 towards the front of the aircraft 10, outer vanes (not depicted here) may also be mounted on the mobile assembly 210. These outer vanes operate like the inner vanes 212, but deploy outwards.

Each inner or outer vane is articulated via its rear edge to the mobile assembly 210 on hinges 213 whereas the free opposite edge is positioned towards the front in the nonobstructing position and towards the engine 20 in the deployed position in the case of the inner vanes 212 and towards the outside in the deployed position in the case of the outer vanes.

Cascades of guide bones may also be installed across the window 211.

The mobile assembly 210 is not described in detail because it is known to those skilled in the art and may adopt various forms.

The mobile assembly 210 is made to move by any suitable means, such as, for example, by cylinder actuators or ball screws. Likewise, the inner and outer vanes are made to move by any suitable means, such as, for example, cylinder actuators or ball screws.

The fixed structure 208 is fixed to the outer shroud 306 by a 12-o'clock beam 250, a 6-o'clock beam 252, a 3-o'clock beam 254 and a 9-o'clock beam which is not visible but which is identical to the 3-o'clock beam 254. Each beam runs parallel to the longitudinal axis X.

Figure 4:
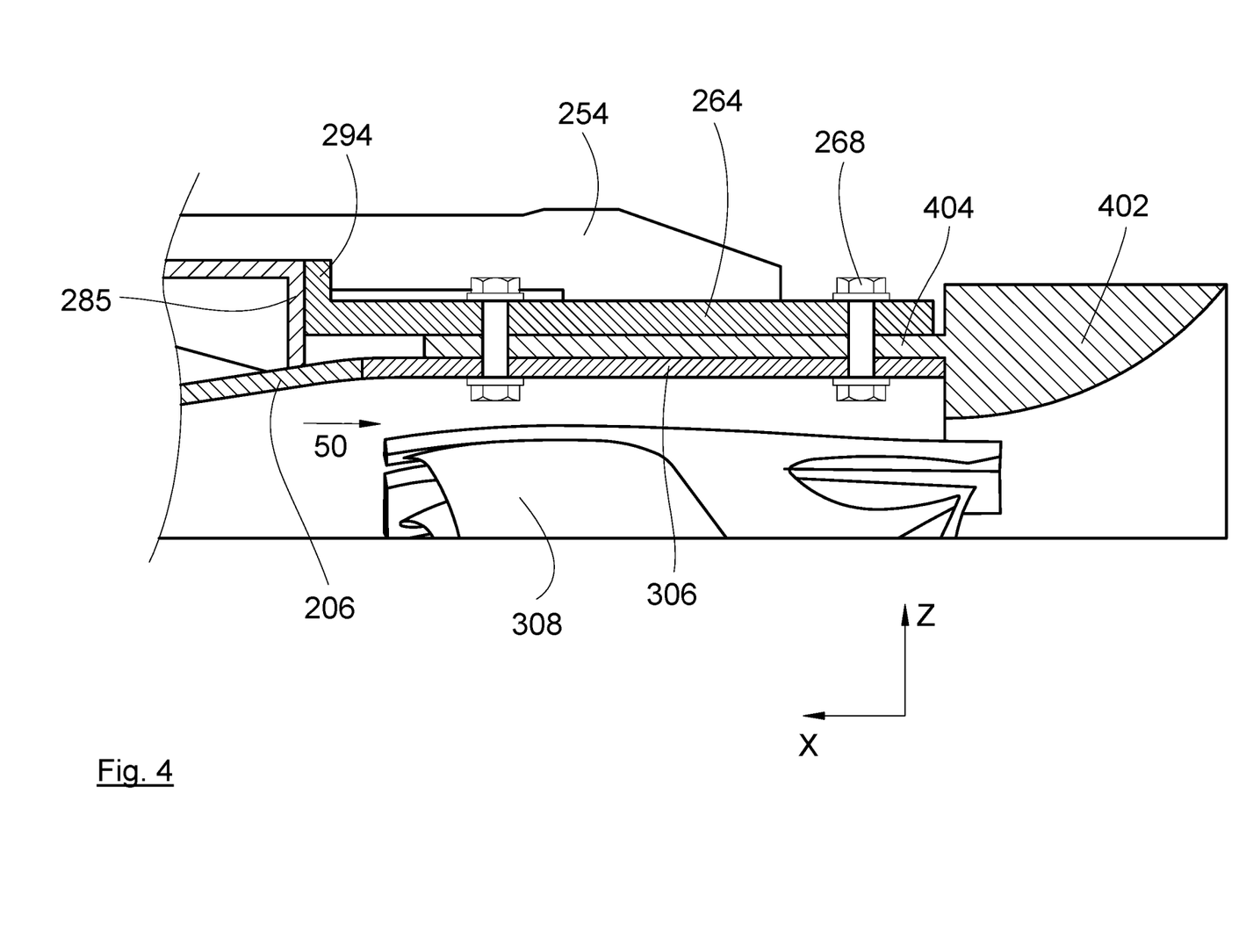
FIG. 4 is a view of the bypass turbojet engine in section on IV-IV of FIG. 3.

As shown in FIG. 4, the bypass turbojet engine 100 also comprises a ramp 402 (fan ramp) which directs the secondary, or bypass, flow 50 to exit the outer shroud 306 and the ramp 402 is fixed to the outer shroud 306. The ramp 402 also takes the form of a cone which widens in the direction of the exit of the outer shroud 306.

Fixing the ramp 402 and the fixed structure 208 to the outer shroud 306 allows a space saving by reducing the number of components and therefore makes it possible to decrease the thickness of the nacelle 102, thereby improving the aerodynamics.

Furthermore, in as much as the ramp 402 is no longer fixed to the mobile assembly, the ramp 402 can now be positioned close behind the outer shroud 306 without the need to provide a significant operating clearance.

The ramp 402 has a skirt 404 which is positioned around the outer shroud 306 so that it can be fixed thereto, in this instance using threaded fasteners 268 such as bolts.

Each beam 250, 252, 254 has a first end which is fixed to the fixed structure 208, in this instance the end facing towards the front, and a second end which is fixed to the outer shroud 306, in this instance the end facing towards the rear.

The second end of each beam 250, 252, 254 is fixed to the outer shroud 306 via a fitting 260, 262, 264 fixed, on the one hand, to the second end and, on the other hand, to the outer shroud 306.

The skirt 404 is positioned between the outer shroud 306 and each fitting 260, 262, 264 so as to be sandwiched between these and thus held in position.

Figure 5:
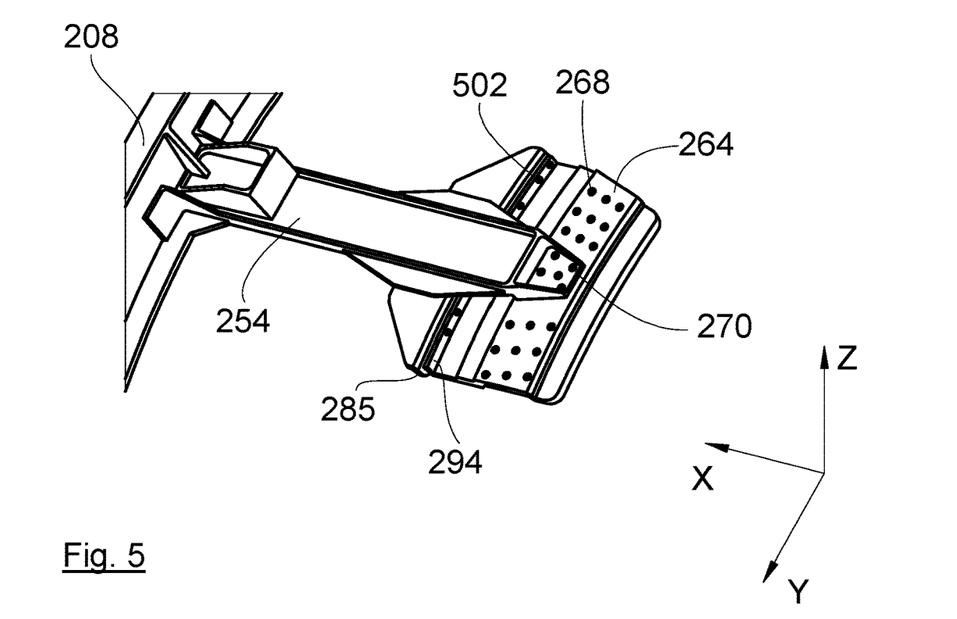
FIG. 5 is a perspective view of the fixing in the region of the 3-o'clock beam.
Figure 6:
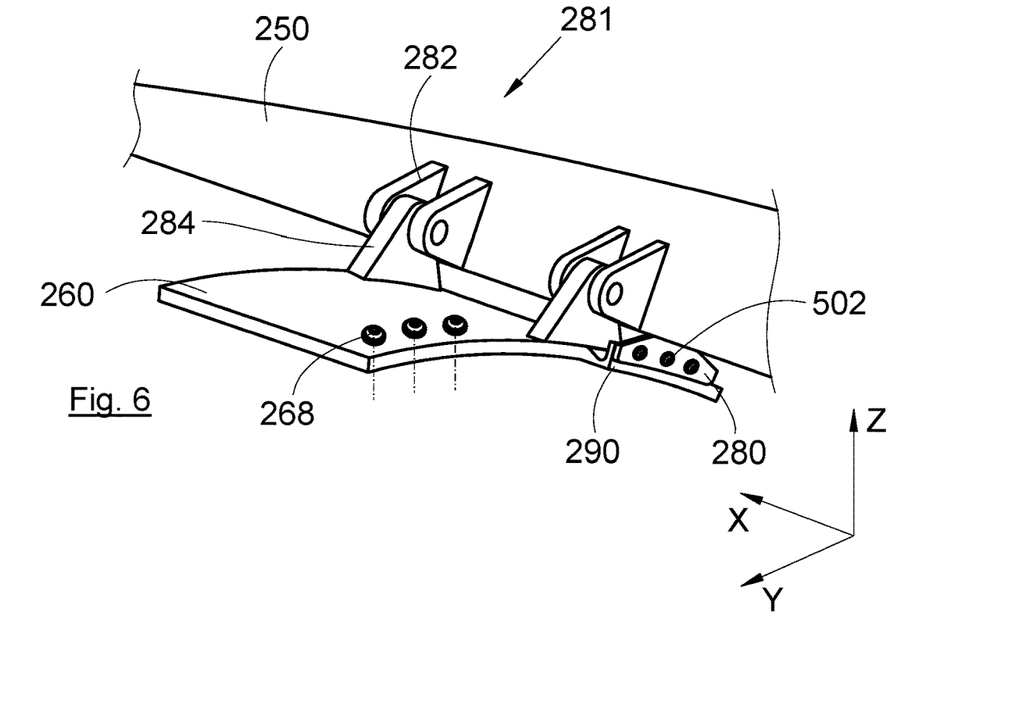
FIG. 6 is a perspective view of the fixing in the region of the 12-o'clock beam.

In order to fix each fitting 260, 262, 264 to the outer shroud 306, clamping bolts 268 are provided to clamp the fitting 260, 262, 264 and the outer shroud 306, firmly sandwiching the skirt 404 between them. The clamping bolts 268 are depicted in FIGS. 5 and 6 and are indicated only in terms of their axes in FIG. 7. The axes of the clamping bolts 268 are radial with respect to the outer shroud 306.

In the invention embodiment shown in FIG. 5, the fixing of the 3-o'clock beam 254 and of the 9-o'clock beam to the fitting 264 is provided by threaded fasteners 270 such as bolts, the axes of which are radial with respect to the outer shroud 306.

In the invention embodiment depicted in FIG. 6, the fixing of the 12-o'clock beam 250 to the fitting 260 is provided by a pivot connection 281 the axis of which is parallel to the longitudinal axis X and which is achieved here by two clevis mounts 282 secured to the 12-o'clock beam 250, each one accommodating a holed plate 284 secured to the fitting 260.

Figure 7:
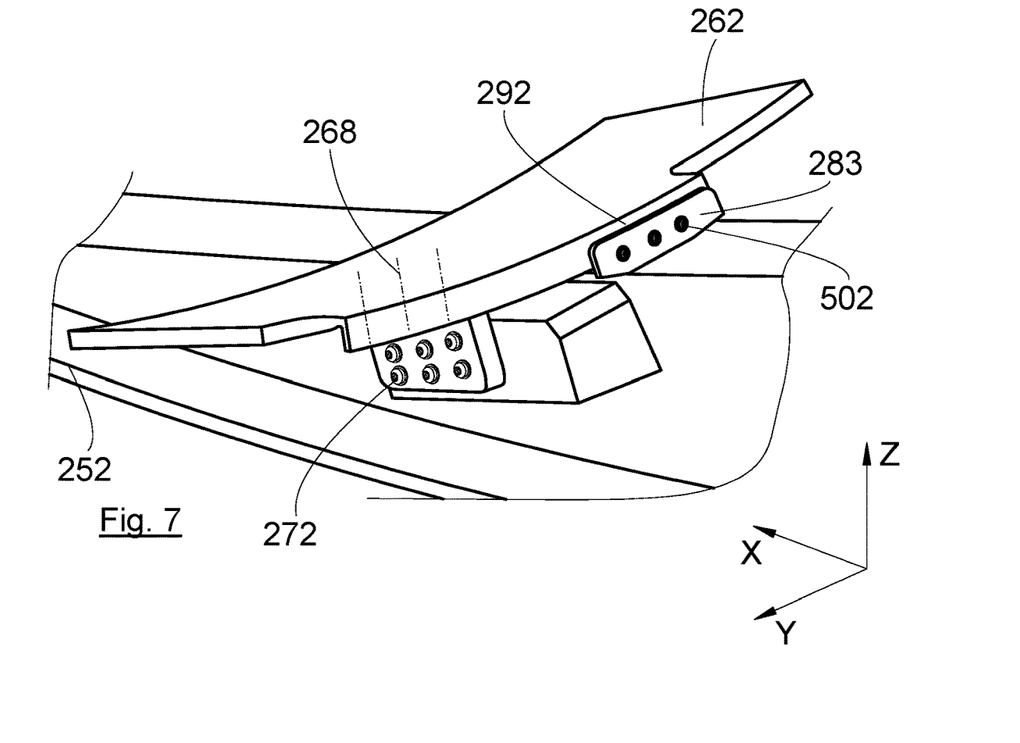
FIG. 7 is a perspective view of the fixing in the region of the 6-o'clock beam.

In the invention embodiment depicted in FIG. 7, the fixing of the 6-o'clock beam 252 to the fitting 262 is provided by threaded fasteners 272 such as bolts, the axes of which are parallel to the transverse axis Y.

Figure 8:
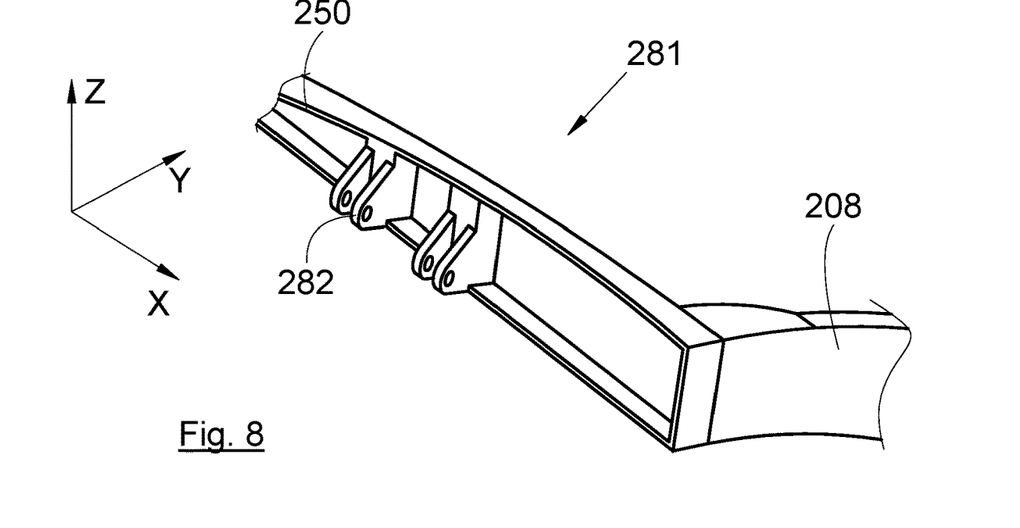
FIG. 8 is a perspective view of one example of a 12-o'clock beam.
Figure 9:
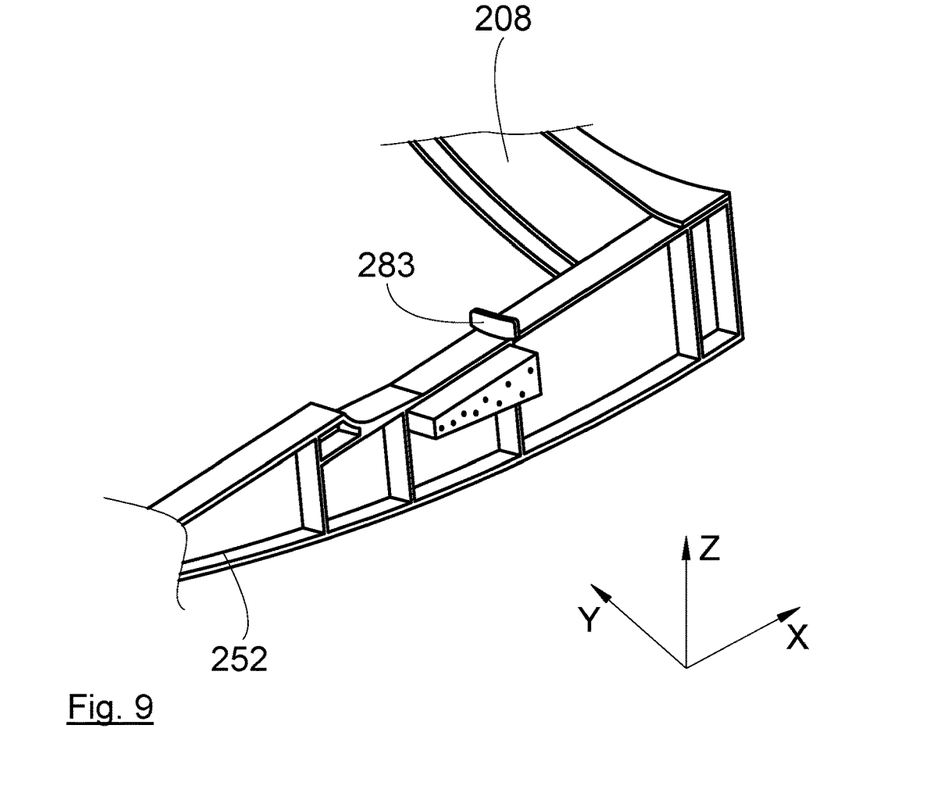
FIG. 9 shows a perspective view of one example of a 6-o'clock beam.

FIGS. 8 and 9 show the 12-o'clock beam 250 and 6-o'clock beam 252 in position with respect to the fixed structure 208 and without the fittings 260, 262.

Each beam 250, 252, 254 is equipped with an end-stop 280, 283, 285 forming a plane perpendicular to the longitudinal axis X, and each fitting 260, 262, 264 has a mating end-stop 290, 292, 294 which likewise forms a plane perpendicular to the longitudinal axis X and which bears against the end-stop 280, 283, 285 of the associated beam 250, 252, 254 so as to block rotation about the vertical axis Z, and act as a stop along the longitudinal axis X in order to react axial loads.

Screws 502 fix the mating end-stops 290, 292 and 294 against the end-stops 280, 283 and 285.

The particular ways in which the fastenings connecting the beams, the fittings and the outer shroud 306 and those connecting the end-stops and mating end-stops are installed make it possible to compensate for the loads transmitted from the engine 20.

The invention has been described more specifically in the case of a nacelle mounted under a wing, but could apply to a nacelle situated at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bypass turbojet engine comprising:
    a core engine,
    a nacelle surrounding the core engine and comprising a fan case, in which a flow path for a secondary, or bypass, flow is delimited between the fan case and the core engine and in which an air flow circulates,
    an intermediate case having a part that forms a hub and an outer shroud radially spaced away from the hub by the secondary flow path and fixed to the hub via arms, in which the outer shroud is situated to a rear and in a continuity of the fan case,
    a fixed structure fixed to the outer shroud,
    a mobile assembly mounted in a configuration to effect translational movement on the fixed structure in a direction of translational movement between a retracted position in which the mobile assembly is moved towards the rear so as to uncover a window between the secondary flow path and an outside, and a forward position in which the window is closed off by the mobile assembly,
    a ramp directly fixed to the outer shroud and configured to direct the secondary, or bypass, flow to exit the outer shroud, and,
    a 12-o'clock beam, a 6-o'clock beam, a 3-o'clock beam, and a 9-o'clock beam,
    wherein each of the beams has a first end which is fixed to the fixed structure and a second end which is fixed to the outer shroud such that the second end of each of the beams is fixed to the outer shroud by means of a fitting fixed both to the second end and to the outer shroud,
    wherein each of the beams is equipped with an end-stop forming a plane perpendicular to a longitudinal axis of the bypass turbojet engine, and wherein each of the fittings has a mating end-stop forming a plane perpendicular to the longitudinal axis bearing against the end-stop of the beam to which the fitting is attached.

2. The bypass turbojet engine according to claim 1, wherein the ramp has a skirt which is positioned around the outer shroud.

3. The bypass turbojet engine according to claim 1, wherein the ramp has a skirt which is positioned around the outer shroud, the skirt is sandwiched between the outer shroud and each of the fittings, and the bypass turbojet engine comprises clamping bolts configured to clamp each of the fittings against the outer shroud.

4. The bypass turbojet engine according to claim 1, wherein the fixing of the 3-o'clock beam to the fitting fixed to the 3-o'clock beam and of the 9-o'clock beam to the fitting fixed to the 9-o'clock beam is achieved by threaded fasteners, wherein axes of the threaded fasteners are radial with respect to the outer shroud.

5. The bypass turbojet engine according to claim 1, wherein the fixing of the 12-o'clock beam to the fitting of the 12-o'clock beam is provided by a pivot connection, wherein an axis of the pivot connection is parallel to a longitudinal axis of the bypass turbojet engine.

6. The bypass turbojet engine according to claim 1, wherein the fixing of the 6-o'clock beam to the fitting of the 6-o'clock beam is provided by threaded fasteners, wherein the axes of the threaded fasteners are parallel to a transverse axis Y of the bypass turbojet engine.

7. An aircraft comprising at least one bypass turbojet engine according to claim 1.

* * * * *